United States Patent
Wang

(10) Patent No.: US 6,892,892 B2
(45) Date of Patent: May 17, 2005

(54) FRUSTUM FILTER USED FOR SEPARATION OF CATION AND ANION EXCHANGE RESINS

(76) Inventor: Hongxiao Wang, No. 229, Binhe Road, New District Suzhou City, Jiangsu 215011 (CN)

( * ) Notice: Subject to any disclaimer, the term of this patent is extended or adjusted under 35 U.S.C. 154(b) by 241 days.

(21) Appl. No.: 10/389,920

(22) Filed: Mar. 18, 2003

(65) Prior Publication Data
US 2003/0209496 A1 Nov. 13, 2003

(30) Foreign Application Priority Data
Mar. 19, 2002 (CN) ........................... 02219473 U

(51) Int. Cl.⁷ ............................ B01D 39/20; B01D 29/00
(52) U.S. Cl. ................... 210/503; 210/445; 210/451; 210/469; 210/477; 210/479; 210/483; 210/497.03; 210/510.1; 502/407
(58) Field of Search .................. 210/445, 451, 210/469, 477, 479, 483, 497.03, 503, 510.1; 502/400, 407, 412

(56) References Cited

U.S. PATENT DOCUMENTS 3,841,489 A * 10/1974 Combest et al. ............ 210/223
4,154,689 A * 5/1979 Yarwood et al. ............ 210/496
6,171,490 B1 * 1/2001 Kim .......................... 210/223
6,357,601 B1 * 3/2002 Bowers et al. .............. 210/455

* cited by examiner

Primary Examiner—John Kim
(74) Attorney, Agent, or Firm—Finnegan, Henderson, Farabow, Garrett & Dunner, L.L.P.

(57) ABSTRACT

A frustum filter used for separation of cation and anion exchange resins, which is used in condensate water polishing system or apparatus, wherein said frustum filter comprises a microporous filtering net body (1) which is formed by sintering a mixture of silicon carbide grains and a binder, said net body being provided with a plurality of micropores, the diameter of said micropores being in a range of 50–300 micron, said filtering net body (1) being shaped as an inverted truncated cone and its maximum diameter being in a range of 50–200 cm, the angle between a inner tapered face and a horizontal plane being in a range of 15°–30° and the thickness of said filtering net body being in a range of 2 cm–14 cm. Some reinforcing steel bars which have the property of high temperature resistance are embedded in said filtering net body(1) in advance. A steel ring (6) welded at the housing (2) is fixed on the external circumference of said filtering net body (1). This invention has the following advantages: it can distribute evenly water and has high strength; it can not be blocked easily and will not create dead zones when filtration; the product of the invention has high strength and cannot be deformed easily over the prior art; it also has the properties of strong acid fastness, strong alkali fastness, high temperature resistance, oxidation resistance.

8 Claims, 2 Drawing Sheets

FRUSTUM FILTER USED FOR SEPARATION OF CATION AND ANION EXCHANGE RESINS

TECHNICAL FIELD

This invention relates to a filter for water treatment, more particularly, to a frustum filter or truncated cone filter used for regeneration and separation of cation and anion exchange resins, which is used in condensate water polishing system or apparatus and enables the cation and anion exchange resins to smoothly flow on the frustum filter.

BACKGROUND OF THE INVENTION

A primary application of condensate water polishing systems is in the large capacity heat power unit (more than 300MW) in a heat power plant. When condensate water passes through a mixed bed containing the cation and anion exchange resins, the ionic impurities in the condensate water are removed by ionic exchange with these resins, thus the condensate water is purified. Meantime, the cation and anion exchange resins will be exhausted after being used for a certain period. At that time, these exhausted resins must be regenerated to restore their capacity to remove the ionic impurities from water in order to be reused. However, said regeneration treatment needs to be done outside the condensate water polishing systems, which is called "external regeneration", since the power plant must be operated continuously. Therefore, during the regeneration treatment, the exhausted anion and cation resins contained in the mixed bed must be separated, and after this, the separated anion and cation resins are regenerated respectively. The higher the separation degree is, the better effect the resin regeneration reaches, thereby the better effect the recycle resins can realize. Such separation of the cation and anion resins is conventionally accomplished by passing water upwardly through a filter provided at the bottom of a separation and regeneration vessel. Said mixed resins are put on the filter, and they are separated by difference in specific gravity. The less dense resin floats upwardly, and the more dense resin goes down.

The structure of conventional filter is a perforated board type water filter comprising a board with a plurality of holes and a plurality of sub-filters mounted on the respective holes correspondingly. Such a structure has dead zones around the sub-filters, and this will result in an uneven filtration and create some dead zones of transporting the resins. Another structure of conventional filter is a porous water distributor which is made by adhering quartz sands with epode resin. Such a structure is too thick and prone to be blocked, and the quartz sands on the surface are liable to drop and contaminate the cation and anion resins. Another structure of conventional filter is disclosed in Chinese utility model patent, Publication No. CN2350122Y, Patent No. ZL98224787.7, published on Nov. 24, 1999, entitled "a water distributer used for separation of anion and cation exchange resins used in polishing condensate water". This patent discloses a filter made from a microporous net board which is formed by sintering stainless steel wires. This patent has significant improvement in term of techniques and effect. Such microporous net board has the following advantages: it can evenly distribute the water, the paths of said micropores are relatively straight and can't be blocked easily, and the cation and anion resins can be well stratified by the water while will not create dead zones. However, the structure of said patent also has following disadvantages: it lacks sufficient firmness and can be deformed easily. Its acid resistance and oxidation resistance properties are both poor.

Accordingly, in order to overcome the above problems, this invention provides a frustum filter or truncated cone filter used for separation of cation and anion exchange resins, which is used in condensate water polishing system or apparatus and enable the cation and anion exchange resins to smoothly flow on the frustum filter. This frustum filter has novel structure and can realize even filtration.

SUMMARY OF THE INVENTION

One object of the invention is to provide a frustum filter or truncated cone filter used for separation of cation and anion exchange resins, which is used in condensate water polishing system or apparatus. The cation and anion exchange resins can smoothly flow on the frustum filter. Said frustum filter comprises a microporous filtering net body which is formed by sintering a mixture of silicon carbide grains and a binder. The net body contains a plurality of micropores. The diameter of the micropores is in a range of 50–300 microns. Said microporous filtering net body is an inverted truncated cone shape and its maximum diameter is in a range of 50–200 cm. The angle between the inner tapered face and the horizontal plane is in a range of 15°–30°, and the thickness of the net body is in a range of 2 cm–14 cm.

In the above structure, said microporous filtering net body also can be shaped as a bowl with a recessed central part.

In the above structure, in order to securely fix the microporous filtering net body in a housing and bear the pressure produced during washing and backwashing, a steel ring is mounted on the external circumference of the net body. The steel ring is welded on the housing. The fixing means between the steel ring and the external circumference of the filtering funnel can be one of the following two ways:

1. An adhesive can be used to permanently connect said steel ring with the external circumference of the microporous filtering net body. This way is very simple, but its firmness and reliability is relative poor.

2. An adhesive can be used to permanently connect said steel ring with the external circumference of the microporous filtering net body. At the same time, the steel ring is provided with an annular protrusion which extends inwardly from the circumference of the steel ring. The annular protrusion engages with the top edge of the microporous filtering net body. A support bracket or a perforated support plate is provided under the microporous filtering net body. Said support bracket is formed by many stainless steel bars connected wit each other. Said support bracket or support plate is welded to the steel ring and supports the microporous filtering net body from below. Said steel ring and said support bracket or support plate constitute a fixing structure of the microporous filtering net body. In such a structure, in order to fix microporous filtering net body more securely, a fixing hole can be provided at the center of the bottom of the net body. A drawing bolt pass through said fixing hole. When the tail end of the bolt is fixed on the support bracket or support plate, the head end of the bolt press against the internal bottom face of the net body.

In the structure mentioned above, some flat reinforcing steel bars can be embedded in the net body in advance in order to increase the strength of the net body. Said flat reinforcing steel bars should be of material with high temperature resistance. Generally, this material can be 316L flat steel or Has alloy.

In the structures mentioned above, the raw material of the microporous filtering net body can comprise: silicon carbide grains, earthware clay (ceramic material) and binder.

The mix proportion of the raw material for making the microporous filtering net body can be as following:

| | |
|---|---|
| Silicon carbide grains with grain size number 36#, 46#, 56#: | 80~95% |
| Binder: | 5~20% |

The three-dimensional shape of the net body is a truncated cone shape with a certain thickness. The thickness of net body should be increased depending on the increase of the maximum diameter of the net body. The bigger the net body is, the thicker the thickness of the net body is. The grain size of silicon carbide grains should be large in order to make the diameter of the micropores sufficient large to reduce the filtering resistance. However, the diameter of said micropores should not exceed 0.2 mm–0.25 mm.

Three kind of the net bodies are listed as follows:

| Grain size number | Maximum diameter of the net body | Thickness of the net body | Amount of binder |
|---|---|---|---|
| 56# and 46# | 988 mm | 6~8 cm | 5~15% |
| 46# (90%) | 1588 mm | 7~10 cm | 7~16% |
| 46# and 36# | 1988 mm | 8~12 cm | 8~18% |

The manufacturing process of said filtering net body comprises the following steps:

1. The raw material is mixed according to the mix proportion;

2. Silicon carbide grains and the binder are blended homogeneously after being mixed;

3. The blended material is molded into a molded body by a die molding process;

4. The molded body is sintered at a high temperature of 1300° C. for 180 hours.

5. The sintered molded body is machined into the final microporous filtering net body.

The invention has following advantages over the prior art:

1. The microporous filtering net body is a unitary structure. It can evenly distribute the water and have higher strength. The flow speed of water in the water dispensing board of the microporous filtering net body is uniform, since the net body has a suitable thickness, and there is a certain distance for water to travel at a slight pressure.

2. The microporous filtering net body has the prosperities of strong acid fastness, strong alkali fastness, high temperature resistance, and oxidation resistance.

3. The product of this invention has high strength and it is hard to be deformed. It has better performance of water distribution compared with the products in the prior art.

The above objects and advantages of the present invention will become more apparent from a reading of the detailed description of the embodiments.

DETAILED DESCRIPTION OF THE PREFERRED EMBODIMENTS

Figure 1:
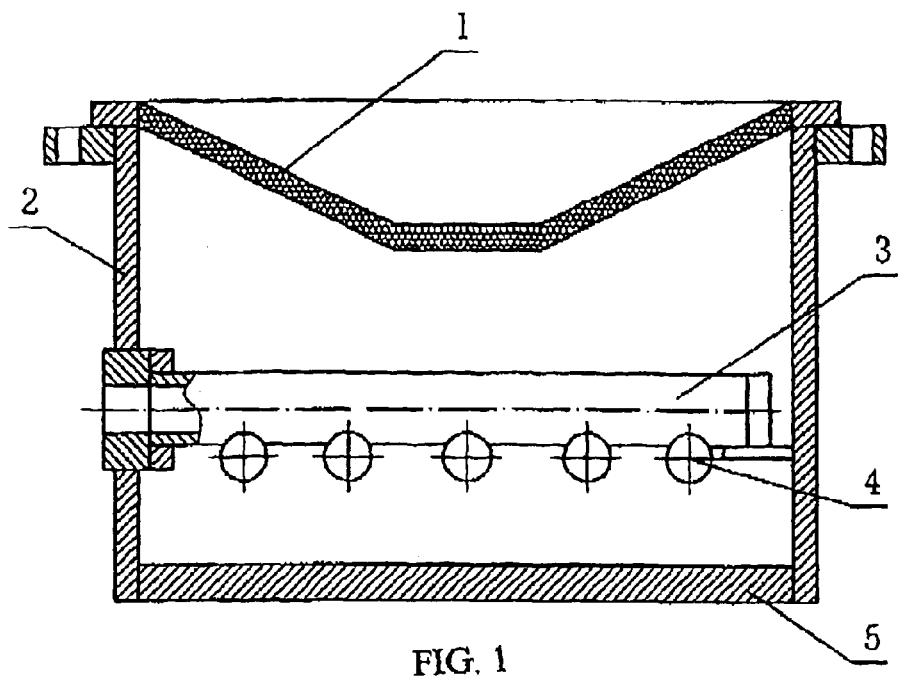
FIG. 1 is a cross-sectional view of a frustum filter according to the invention.
Figure 2:
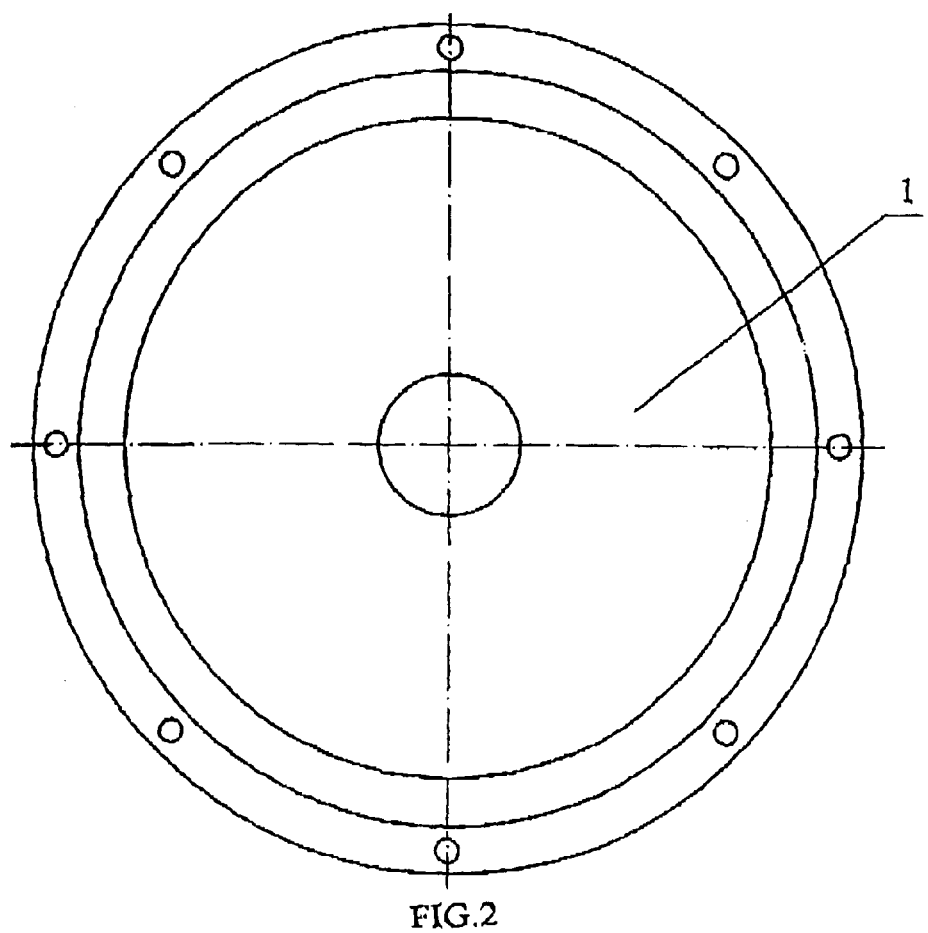
FIG. 2 is a top view of FIG. 1.
Figure 3:
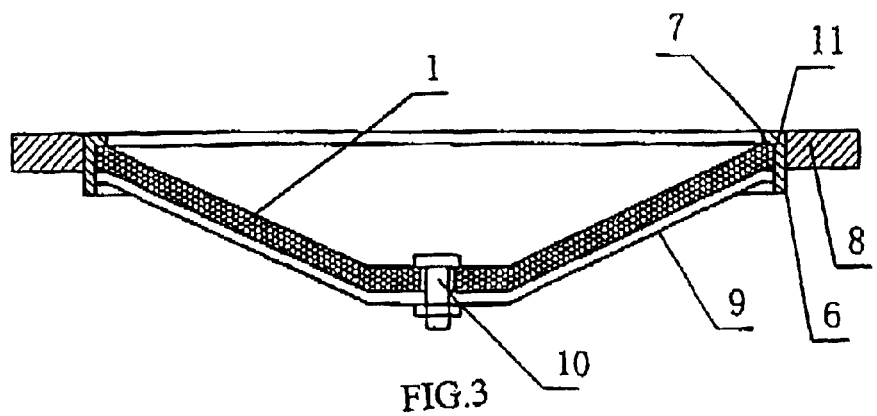
FIG. 3 is a cross-sectional view of a fixed setting structure of the microporous filtering net body.
Figure 4:
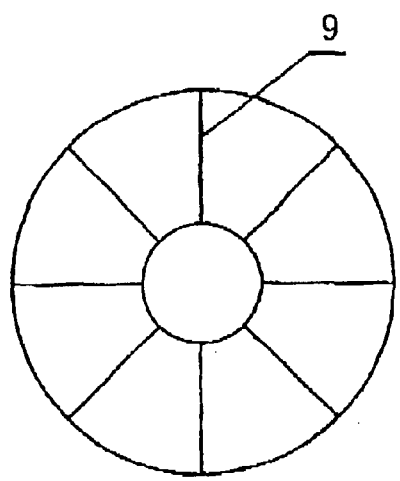
FIG. 4 is a view of a support bracket which can be used in the frustum filter of the invention.
Figure 5:
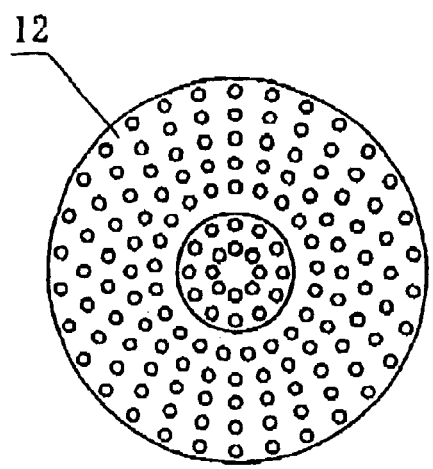
FIG. 5 is a view of a support plate which can be used in the frustum filter of the invention.

A frustum filter or truncated cone filter according to the invention will be described hereinbelow in connection with preferred embodiments referring to FIGS. 1–4.

A frustum filter of preferred embodiments is shown in FIG. 1–FIG. 4. Said filter comprises a microporous filtering net body 1. Said microporous filtering net body 1 is made by sintering the mixture of silicon carbide grains and a binder. The net body contains a plurality of micropores. The diameter of said micropores is in a range of 50–300 microns. Said net body 1 is shaped as an inverted truncated cone and its diameter is 998 mm. The angle between the inner taper face and a horizontal plane is 20°. The thickness of the net body 1 is 8 cm. The net body 1 is provided in a housing 2 which contain several branch pipes 4 communicating with a water inlet pipe 3. Several holes are formed in the branch pipes 4. The net body 1 is above the branch pipes 4. A steel ring 6 welded on the flange 8 of the housing 2 is fixed on the external circumference of filtering net body 1 by adhesive. The steel ring 6 is provided with an annular protrusion 7 which extends inwardly from the circumference of the steel ring. The annular protrusion 7 engages with the top edge of the filtering net body 1. A support bracket 9 is provided under the filtering net body 1. Said support bracket is formed by many stainless steel bars connected with each other. Said support bracket 9 is welded to the steel ring 6 and supports the filtering net body 1 from below. Said steel ring 6 and said support bracket 9 constitute a fixing setting structure of the filtering net body 1. A fixing hole can be formed at the center of the bottom of the filtering net body 1. A drawing bolt 10 passes through said fixing hole. When the tail end of the bolt is fixed on the support bracket by nut, the head end of the bolt press against the internal bottom face of the filtering net body.

The raw material of the filtering net body preferably comprises silicon carbide grains and a binder. The preferred mix proportion of said raw material for making the filtering net body can be as follows:

| | |
|---|---|
| Silicon carbide grains with grain size number 46#, 56# | 90% |
| Binder | 10% |

The manufacturing process of said microporous filtering net body comprises the following steps:

1. The raw material is mixed according to the mix proportion;

2. Silicon carbide grains and the binder are blended homogeneously after being mixed;

3. The blended material is molded into a molded body by a die molding process;

4. The molded body is sintered at a high temperature of 1300° C. for 180 hours.

5. The sintered molded body is machined into the final filtering net body.

Reference signs:
1. Filtering net body
2. Housing
3. Water inlet pipe
4. Branch pipe
5. Bottom board
6. Steel ring
7. Annular protrusion
8. Flange
9. Support bracket
10. Drawing bolt
11. Welding portion
12. Support plate

What is claimed is:

1. A frustum filter used for separation of cation and anion exchange resins, which is used in condensate water polishing system or apparatus, wherein said frustum filter comprises a microporous filtering net body (1) which is formed by sintering a mixture of silicon carbide grains and a binder, said net body being provided with a plurality of micropores, the diameter of said micropores being in a range of 50–300 micron, said filtering net body (1) being shaped as an inverted truncated cone and its maximum diameter being in a range of 50–200 cm, the angle between a inner tapered face and a horizontal plane being in a range of 15°–30° and the thickness of said filtering net body being in a range of 2 cm–14 cm.

2. A frustum filter according to claim 1, wherein said microporous filtering net body can be shaped as a bowl with a recessed central part.

3. A frustum filter according to claim 1, wherein a steel ring (6) welded on a housing (2) is fixed on the external circumference of said filtering net body (1).

4. A frustum filter according to claim 3, wherein the steel ring (6) can be fixed on the external circumference of the filtering net body (1) by adhesive.

5. A frustum filter according to claim 3 or 4, wherein the steel ring (6)is provided with an annular protrusion (7) which extends inwardly from the circumference of the steel ring, the annular protrusion (7) being engaged with the top edge of the filtering net body (1), a support bracket (9) or a perforated support plate (12) being provided under the microporous filtering net body (1), said support bracket being formed by many stainless steel bars connected with each other, said support bracket (9) or support plate (12) being welded to the steel ring (6) and supporting the filtering net body (1) from below, said steel ring (6) and said support bracket or said support plate constituting a fixing construction of the filtering net body.

6. A frustum filter according to claim 5, wherein a fixing hole is provided at the center of the bottom of the filtering net body (1), and a drawing bolt (10) pass through said fixing hole, the head end of which press against the internal bottom face of the net body and the tail end of which is fixed on the support bracket (9) or support plate (12).

7. A frustum filter according to claim 1, wherein some reinforcing steel bars are embedded in said filtering net body (1) in advance, and said reinforcing steel bars have the property of high temperature resistance.

8. A frustum filter according to claim 2, wherein the bowl-shaped net body with a recessed central part can be removed to be cleaned separately.

* * * * *